(12) United States Patent
Shetty et al.

(10) Patent No.: US 12,107,809 B2
(45) Date of Patent: Oct. 1, 2024

(54) FORMATTING ELECTRONIC MESSAGES USING MACHINE LEARNING

(71) Applicant: VMWARE, INC., Palo Alto, CA (US)

(72) Inventors: Rohit Pradeep Shetty, Bangalore (IN); Ravish Chawla, Atlanta, GA (US); Adam Chow, Atlanta, GA (US)

(73) Assignee: Omnissa, LLC, Palo Alto, CA (US)

( * ) Notice: Subject to any disclaimer, the term of this patent is extended or adjusted under 35 U.S.C. 154(b) by 0 days.

(21) Appl. No.: 17/590,836

(22) Filed: Feb. 2, 2022

(65) Prior Publication Data
US 2023/0171210 A1    Jun. 1, 2023

(30) Foreign Application Priority Data
Nov. 30, 2021 (IN) .............................. 202141055431

(51) Int. Cl.
*H04L 51/066* (2022.01)
*G06F 40/103* (2020.01)
*G06F 40/284* (2020.01)
*G06N 20/00* (2019.01)

(52) U.S. Cl.
CPC .......... *H04L 51/066* (2013.01); *G06F 40/103* (2020.01); *G06F 40/284* (2020.01); *G06N 20/00* (2019.01)

(58) Field of Classification Search
CPC .... H04L 51/066; G06N 20/00; G06N 3/0442; G06N 3/0455; G06N 5/022; G06F 40/103; G06F 40/40; G06F 40/284

USPC .................................................. 709/224, 226
See application file for complete search history.

(56) References Cited

U.S. PATENT DOCUMENTS

| | | | |
|---|---|---|---|
| 7,904,594 B2 * | 3/2011 | Spicer | H04L 51/066 709/246 |
| 2006/0155715 A1 * | 7/2006 | Duffek | G06Q 10/107 |
| 2012/0191787 A1 * | 7/2012 | Huang | H04L 61/301 709/206 |
| 2013/0339137 A1 * | 12/2013 | Lempel | G06Q 30/02 705/14.49 |
| 2015/0100649 A1 * | 4/2015 | Shmarovoz | H04L 51/42 709/206 |
| 2015/0121203 A1 * | 4/2015 | Saund | G06F 40/103 715/249 |
| 2016/0087925 A1 * | 3/2016 | Kalavagattu | H04L 51/066 709/206 |
| 2016/0294759 A1 * | 10/2016 | Huang | H04L 51/063 |
| 2017/0155763 A1 * | 6/2017 | Bekanich | H04M 3/42382 |
| 2020/0145365 A1 * | 5/2020 | Kamens | H04L 51/066 |
| 2020/0348829 A1 * | 11/2020 | Fay | G06N 20/00 |

* cited by examiner

*Primary Examiner* — Alina A Boutah
(74) *Attorney, Agent, or Firm* — Kim & Stewart LLP

(57) ABSTRACT

Disclosed herein are examples of systems and methods for formatting electronic messages using machine learning. An electronic message can be obtained, and a processed message can be generated based at least in part on the electronic message. At least one attribute for the processed message can be determined. A formatting specification can be generated based at least in part on the at least one attribute. A reformatted message can be generated based at least in part on the formatting specification.

16 Claims, 5 Drawing Sheets

FORMATTING ELECTRONIC MESSAGES USING MACHINE LEARNING

RELATED APPLICATION

Benefit is claimed under 35 U.S.C. 119(a)-(d) to Foreign Application Serial No. 202141055431 filed in India entitled "FORMATTING ELECTRONIC MESSAGES USING MACHINE LEARNING", on Nov. 30, 2021, by VMware, Inc., which is herein incorporated in its entirety by reference for all purposes.

BACKGROUND

Emails, chat messaging, and other electronic messaging services are an integral part of daily life. On a given day, a user may send and receive many such electronic messages. However, while a sender may spend time and attention on composing a message based on the sender's formatting preferences, this time and attention may not result in an enhanced experience for the recipient. A recipient may find that many messages that the recipient receives are poorly formatted or otherwise not consistent with the recipient's preferences. Thus, a recipient may desire that received messages reflect the recipient's own preferences, rather than the preferences of the sender. But composing messages consistent with a recipient's preferences is often not feasible considering that each recipient has personal preferences, which may vary greatly from recipient to recipient. This results in messages reflecting a sender's own preferences rather than the preferences of the recipient.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

The present disclosure relates to automatically formatting a sender's electronic messages based on the recipient's formatting preferences. For example, when a sender sends a message to a particular recipient, the message can be reformatted to be consistent with the formatting preferences of the recipient. As another example, when a sender begins to compose a message to a particular recipient, the sender can be recommended how to format the email consistent with the formatting preferences of the recipient.

Figure 1:
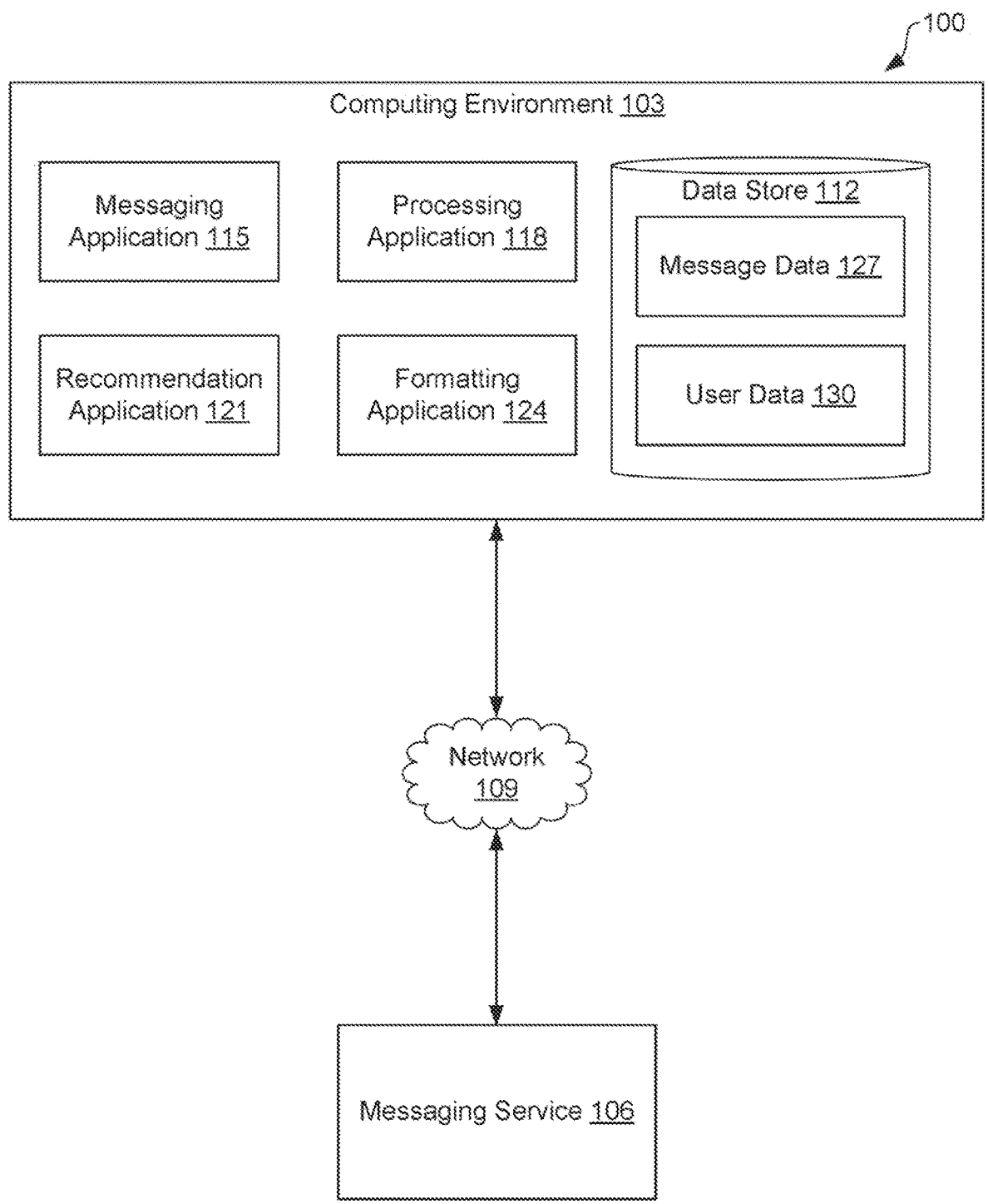
FIG. 1 shows an example of a networked environment, according to various embodiments of the present disclosure.

FIG. 1 shows an example of a networked environment 100. The networked environment can include a computing environment 103 and a messaging service 106 in communication through a network 109.

The network 109 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 109 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can include a data store 112. The data store 112 can include memory of the computing environment 103, mass storage resources of the computing environment 103, or any other storage resources on which data can be stored by the computing environment 103. The data store 112 can include one or more databases, such as a structured query language (SQL) database, a non-SQL database, or other appropriate database. The data stored in the data store 112, for example, can be associated with the operation of the various applications or functional entities described below.

The components executed in the computing environment 103 can include, for example, a messaging application 115, a processing application 118, a recommendation application 121, a formatting application 124, as well as other applications, services, processes, systems, engines, or functionality not discussed in detail herein.

The messaging application 115 can be executed to facilitate sending and receiving of electronic messages. The messaging application 115 can provide a message to the messaging service 106 via the network 109 so that the messaging service 106 can provide the message to one or more intended recipients of the message. Likewise, the messaging application 115 can receive via the network 109 messages intended for a user of the messaging application 115 from the messaging service 106. The messaging application 115 can include an email application, an instant messaging application, a short message service (SMS) or multimedia message service (MMS) application, or other application capable of sending and receiving electronic messages.

In some implementations, the messaging application 115 can provide functionality that can allow a user to compose messages. A message can include a header with metadata provided by the user or generated by the messaging application 115. This metadata can include, for instance, the intended recipients of the message, a subject of the message, a date and time at which the message was generated or sent, and other metadata. In some implementations, the messaging application 115 can indicate in the header whether each intended recipient of a message is a primary recipient or a secondary recipient of the message. A primary recipient can be a recipient included in a "To" field of a message's header, for example. As another example, a secondary recipient can be a recipient included in a "CC" or "BCC" field of a message's header.

A message can further include a body that can contain content of the message. The content can include text, which can be unstructured or structured based on one or more formatting elements. The messaging application 115 can receive text input through one or more input devices to generate a body of a message. The messaging application 115 can also allow formatting elements to be added to text in the body of a message. Formatting elements can include, for example, bulleted lists, highlighting, font size, or other types or manners of formatting text.

The processing application 118 can be executed to process a message by tokenizing formatting information in the unprocessed message to generate a processed message. For example, the processing application 118 can assign character-based tokens to formatting elements in the unprocessed message. In that case, the processing application 118 can identify any formatting elements in a body of the unprocessed message. For example, the processing application 118 can sequentially examine characters or other data in the body of the message and determine whether each character or other datum is a formatting element. The processing application 118 can iteratively examine characters and other data in the body until a formatting element is encountered or an end of the message is reached. The processing application 118 can repeat this process until an end of the message is reached.

If the unprocessed message includes one or more formatting elements, the processing application 118 can generate a token that represents each of those formatting elements. The token can be any character-based token or other form of token that can represent the formatting element. Likewise, the token can represent a manner in which the formatting element is applied to the text in the body of the message. The processing application 118 can then replace the formatting elements with their corresponding tokens in the text of the unprocessed message to generate the processed message.

The recommendation application 121 can be executed to generate a formatting specification for a message based at least in part on one or more attributes of the message. The formatting specification can be provided to the formatting application 124 to generate a reformatted message or used by the recommendation application 121 to generate a formatting recommendation. The attributes of a message can include, for example, a relationship attribute, a message type attribute, and a frequency attribute. The recommendation application 121 can determine the attributes of a message using, for example, a classification model.

The relationship attribute can represent a relationship of the sender to the recipient within organizational or social contexts associated with the sender and recipient. As an example, the relationship attribute can reflect whether the sender and recipient are associated with a same enterprise or other organization. As another example, the relationship attribute can reflect factors that represent how the sender and recipient are related within an enterprise or other organization. These factors can include the relative seniority of the sender and recipient within an enterprise, their association with the same or different departments or teams within the enterprise, projects to which each has been assigned and their roles within those projects, and other factors. As an additional example, the relationship attribute can reflect a geographic location of the sender and a geographic location of the recipient. The relationship attribute can become more refined as more data is collected. In some implementations, a message can include multiple relationship attributes if, for example, the sender and the recipient relate to each other in multiple contexts or in multiple ways.

The message type attribute can represent a type or classification of a message. The classifications can include predefined categories such as, for example, project updates, queries, informal conversations, promotions, announcements, and other categories. The recommendation application 121 can determine a message type attribute based on information from the body of the message, the subject of the message, and other data. In some implementations, a clustering algorithm can be used to determine a message's message type attribute.

The frequency attribute can represent a frequency of messages sent by the sender. In some implementations, the frequency attribute can represent the frequency of messages sent by the sender to the recipient in particular or the frequency of all messages between the sender and the recipient. The frequency attribute can become more refined as more messages are sent.

The recommendation application 121 can generate a formatting specification for the message based on these attributes. A formatting specification can include a set of formatting rules based on a mapping of a message's attributes to corresponding formatting preferences. The recommendation application 121 can map the attributes from a message to a set of formatting preferences corresponding to that combination of attributes. For example, if a message concerns a project involving both the sender and recipient about which the sender and recipient frequently communicate, the message may be formatted relatively informally and use bullet points with brief sentences. As another example, if a message is a query to a recipient in a supervisory role over the sender with whom the sender infrequently communicates, the message may be formatted relatively formally with formal paragraphs and longer sentences.

In some implementations, the recommendation application 121 can determine these attributes—and thus generate a formatting specification—for a primary intended recipient of the message. In other implementations, the recommendation application 121 can determine these attributes for each intended recipient of a message, including both primary recipients and any secondary recipients. In such implementations, the recommendation application 121 can generate a formatting specification for each of these intended recipients. Thus, if a message has multiple intended recipients, the recommendation application 121 can generate multiple formatting specifications—a separate formatting specification for each intended recipient.

In some implementations, the recommendation application 121 can generate a formatting recommendation. The formatting recommendation can indicate one or more formatting preferences of a corresponding recipient. The formatting recommendation can indicate one or more formatting preferences of a corresponding recipient. In some implementations, the recommendation application 121 can generate a formatting recommendation in response to a selection of one or more recipients for the message before a body of the message is composed. In other implementations, the recommendation application can generate the formatting recommendation if an option to view a formatting recommendation was selected by a user of the messaging application 115. The recommendation application 121 can provide the formatting recommendation to the messaging application 115, and the messaging application 115 can present the formatting recommendation to a user.

The formatting application 124 can be executed to reformat a message. The formatting application 124 can generate a reformatted message using a formatting specification generated by the recommendation application 121 and a processed message. In some implementations, if the recommendation application 121 provides multiple formatting specifications, the formatting application 124 can generate multiple reformatted messages—a separate reformatted message for each of the multiple formatting specifications.

In some implementations, the formatting application 124 can employ a sequence-to-sequence model to generate reformatted messages. The sequence-to-sequence model can be a deep-learning model capable of machine translation based on an encoder-to-decoder neural network architecture. A processed message can be input into the sequence-to-sequence model to generate a reformatted message as an output. The sequence-to-sequence model can include an encoder and a decoder. The encoder and the decoder can each include, for example, one or more recurrent neural networks such as long short-term memory (LSTM) networks or gated recurrent unit (GRU) networks. The encoder can encode an input sequence from a processed message—or, in some implementations, an unprocessed message—to generate a context vector that represents the meaning of the input sequence. The context vector can be input into the decoder, which can decode the context vector to generate an output sequence that represents a reformatted message.

In some implementations, the formatting application 124 can be trained using a dataset sufficient to allow the sequence-to-sequence model or other model employed by the formatting application 124 to learn common styles for formatting electronic messages. For example, the formatting application 124 can be trained using a publicly available mass dataset of electronic messages. As another example, the formatting application 124 can be trained using a dataset of electronic messages sent and received by users associated with an enterprise, organization, or other group that administers the computing environment 103 or the messaging service 106. As an additional example, the formatting application 124 can be trained for a period of time using messages sent as those messages are sent. In some implementations, as messages are sent and received, these messages can be provided to formatting application 124 after processing by the processing application 118 to further train the formatting application 124.

In some implementations, the formatting application 124 can trained based at least in part on formatting preferences provided by a user. A user can provide one or more formatting templates or formatting parameters that indicate the user's formatting preferences for one or more given attributes. A user can also specify that these formatting preferences may be applicable to messages having particular attributes. For example, a user can provide a set of formatting preferences applicable to messages sent to the user's supervisor in an enterprise, to messages associated with a project, or to other circumstances reflected by one or more attributes.

The message data 127 can represent information regarding messages sent and received by the messaging application 115. The message data 127 can include a record for each message sent and received by the messaging application 115. Each record in the message data 127 can include metadata from the header of the message—including, for example, the sender and recipients of the message, a subject of the message, a data and time at which the message was generated or sent, or other data. The recommendation application 121 can use this metadata from the message data 127 when determining the frequency attribute or other attribute of the message.

Each record in the message data 127 can further include data from the body of the message. For example, the message data 127 can include text from the body as well as any formatting elements included in the body. The recommendation application 121 can use this data from the bodies of messages when generating a formatting specification based on one or more attributes of a message. Once the recommendation application 121 determines one or more attributes for a particular message, the one or more attributes can be included in the message data 127.

The user data 130 can represent information about users from whom the messaging application 115 has received one or more messages and information about users to whom the messaging application 115 has sent one or more messages, as well as information regarding the user of the messaging application 115. These formatting preferences can be determined by the formatting application 124 during training or provided by the user. In some implementations, this user data 130 can be provided to other users associated with a same enterprise or other organization as the user of the messaging application 115.

For example, the user data 130 can include one or more formatting preferences for one or more users. As another example, the user data 130 can include biographical information regarding these users such as name, primary geographical location, or other information. As an additional example, the user data 130 can include indications of any enterprises, teams, departments, or other organizations with which users are associated, as well as any positions held by the users in those organizations. As a further example, the user data 130 can include any projects with which users are associated, as well as any roles held by the users in those projects. In some implementations, the recommendation application 121 can use the user data 130 to generate the relationship attribute or other attribute of the message.

The messaging service 106 can represent one or more cloud-based services that provide electronic messaging services to the messaging application 115 and as well as to other applications and devices. The messaging service 106 can include one or more server banks, computer banks, computing clusters, or other arrangements. The messaging service 106 can be associated with and/or hosted by an enterprise or a third party. The messaging service can perform messaging sever functions using Simple Mail Transfer Protocol (SMTP), Internet Message Access Protocol (IMAP), Post Office Protocol (POP), Extensible Messaging and Presence Protocol (XMPP), Internet Relay Chat (IRC), WebSocket, SMS, MMS, and/or other messaging protocols.

The messaging service 106 can facilitate delivery of messages to and from the messaging application 115. For example, the messaging service 106 can receive a message from the messaging application 115 over the network 109. The messaging service 106 can then send the message to one or more recipients of the message listed in the message's header. As another example, the messaging service 106 can receive a message intended for a user of the messaging application 115 and provide the message to the messaging application 115 over the network 109. In some implementations, the messaging service 106 can also perform functionality of the processing application 118, the recommendation application 121, and/or the formatting application 124.

Figure 2:
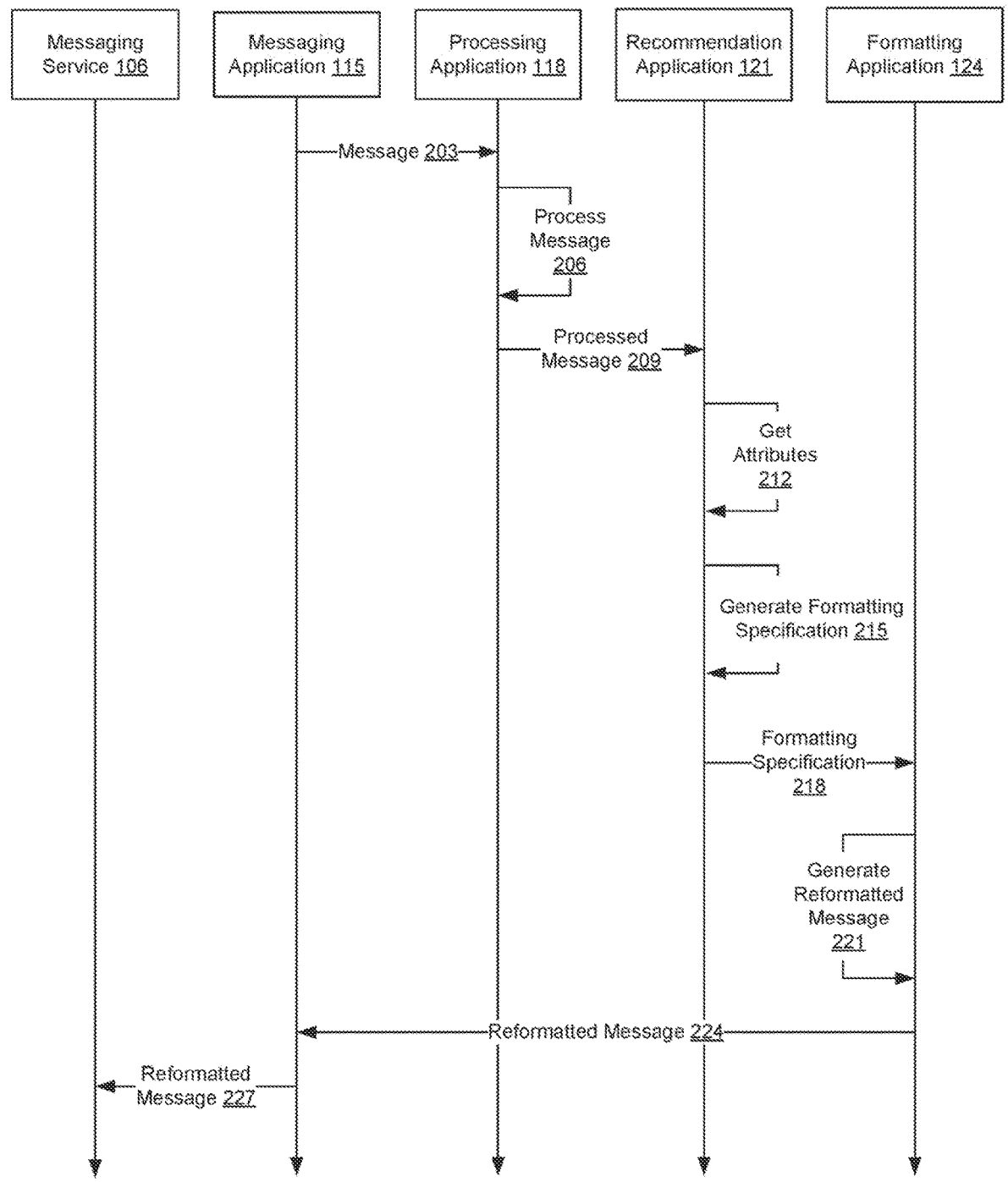
FIG. 2 shows a sequence diagram that provides one example of functionality implemented by components of the networked environment, according to various embodiments of the present disclosure.

FIG. 2 shows a sequence diagram that provides one example of functionality implemented by components of the networked environment 100. It is understood that the sequence diagram of FIG. 2 provides merely an example of the many different types of functional arrangements that can be employed to implement the portions of the networked environment 100 as described herein. As an alternative, the sequence diagram of FIG. 2 can be viewed as depicting an example of elements of a method implemented within the networked environment 100.

At step 203, the messaging application 115 can provide an electronic message to the processing application 118. The message can include a header with metadata that indicates one or more intended recipients of the message, which can include one or more primary intended recipients and any secondary intended recipients. The message can further include a body that can include text and one or more formatting elements.

At step 206, the processing application 118 can process the message received from the messaging application 115 to generate a processed message. The processing application 118 can identify any formatting elements in the body of the message. If the unprocessed message includes one or more formatting elements, the processing application 118 can generate a token that represents each of those formatting elements. The processing application 118 can then replace the formatting elements with their corresponding tokens in the text of the unprocessed message to generate the processed message. At step 209, the processing application 118 can provide the processed message to the recommendation application 121.

At step 212, the recommendation application 121 can determine one or more attributes of the processed message. The recommendation application 121 can determine the attributes of a message using, for example, a classification model. The attributes of a message can include, for example, a relationship attribute, a frequency attribute, and a message type attribute. For example, the recommendation application 121 can use metadata from the user data 130 to determine the relationship attribute. As another example, the recommendation application 121 can use data from the message data 127 to determine the frequency attribute. As an additional example, the recommendation application 121 can use data from the headers and bodies of emails from the message data 127 to determine the message type attribute.

At step 215, the recommendation application 121 can generate a formatting specification for the processed message. The recommendation application 121 can map the attributes for the message to a set of formatting preferences corresponding to that combination of attributes from the user data 130. The formatting specification can include a set of formatting rules based on this mapping of a message's attributes to the corresponding formatting preferences. At step 218, the recommendation application 121 can provide the formatting specification and the processed message to the formatting application 124.

At step 221, the formatting application 124 can generate a reformatted message. The reformatted message can include one or more formatting elements consistent with formatting preferences of one or more intended recipients of the message. In some implementations, the formatting application 124 can generate a reformatted message using a formatting specification generated by the recommendation application 121 and the processed message. The formatting application 124 can generate the reformatted message using, for example, a sequence-to-sequence model.

At step 224, the formatting application 124 can provide the reformatted message to the messaging application 115. Then, at step 227, the messaging application 115 can provide the reformatted message to the messaging service 106 via the network 109. The messaging application 115 can then provide the reformatted message to one or more recipients of the message.

Figure 3:
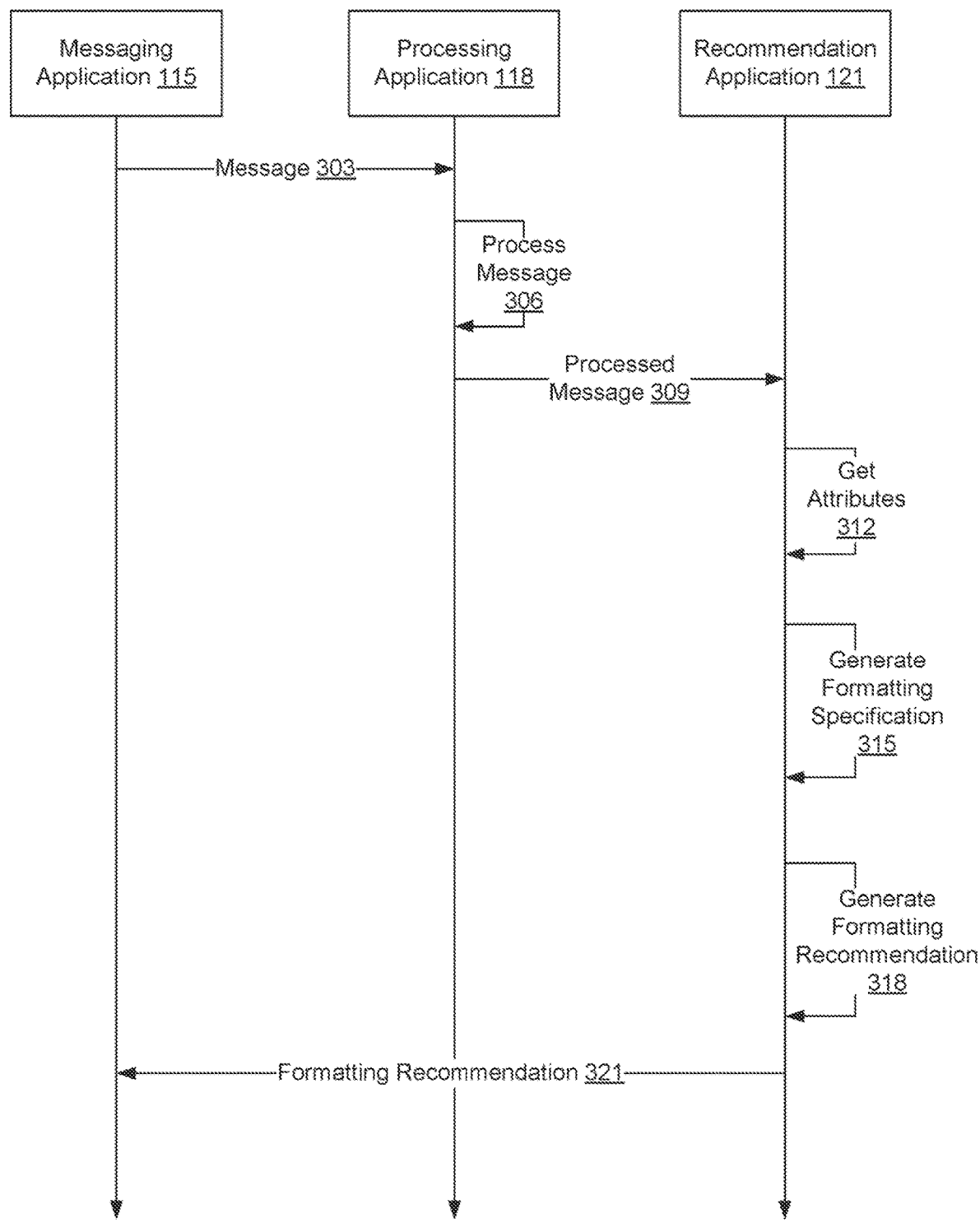
FIG. 3 shows a sequence diagram that provides one example of functionality implemented by components of the networked environment, according to various embodiments of the present disclosure.

FIG. 3 shows a sequence diagram that provides one example of functionality implemented by components of the networked environment 100. It is understood that the sequence diagram of FIG. 3 provides merely an example of the many different types of functional arrangements that can be employed to implement the portions of the networked environment 100 as described herein. As an alternative, the sequence diagram of FIG. 3 can be viewed as depicting an example of elements of a method implemented within the networked environment 100.

At step 303, the messaging application 115 can provide an electronic message to the processing application 118. The message can include a header with metadata that indicates one or more intended recipients of the message, which can include one or more primary intended recipients and any secondary intended recipients. The message can further include a body that can include text and one or more formatting elements.

At step 306, the processing application 118 can process the message received from the messaging application 115 to generate a processed message. The processing application 118 can identify any formatting elements in the body of the message. If the unprocessed message includes one or more formatting elements, the processing application 118 can generate a token that represents each of those formatting elements. The processing application 118 can then replace the formatting elements with their corresponding tokens in the text of the unprocessed message to generate the processed message. At step 309, the processing application 118 can provide the processed message to the recommendation application 121.

At step 312, the recommendation application 121 can determine one or more attributes of the processed message. The recommendation application 121 can determine the attributes of a message using, for example, a classification model. The attributes of a message can include, for example, a relationship attribute, a frequency attribute, and a message type attribute. For example, the recommendation application 121 can use metadata from the user data 130 to determine the relationship attribute. As another example, the recommendation application 121 can use data from the message data 127 to determine the frequency attribute. As an additional example, the recommendation application 121 can use data from the headers and bodies of emails from the message data 127 to determine the message type attribute.

At step 315, the recommendation application 121 can generate a formatting specification for the processed message. The recommendation application 121 can map the attributes for the message to a set of formatting preferences corresponding to that combination of attributes from the user data 130. The formatting specification can include a set of formatting rules based on this mapping of a message's attributes to the corresponding formatting preferences.

At step 318, the recommendation application 121 can generate a formatting recommendation. The formatting recommendation can indicate one or more formatting preferences of a corresponding recipient. The formatting recommendation can be generated based on the formatting specification. Thus, the one or more formatting preferences indicated in the formatting recommendation can correspond to one or more attributes of the message.

And at step 321, the recommendation application 121 can provide the formatting recommendation to the messaging application 115. The messaging application 115 can present the formatting recommendation to a user, which can allow the user to compose the body of the message using information from the formatting recommendation.

Figure 4:
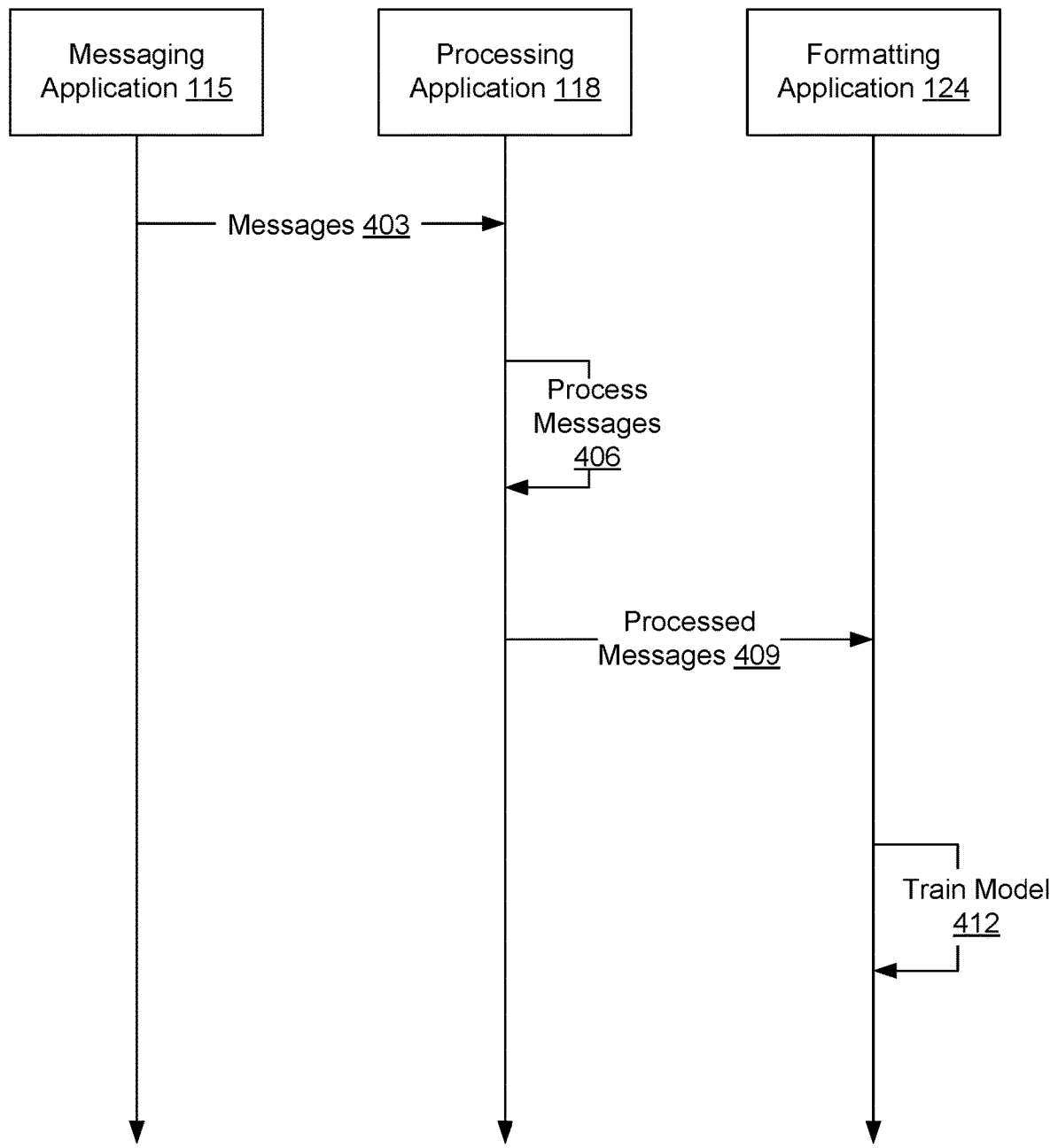
FIG. 4 shows a sequence diagram that provides one example of functionality implemented by components of the networked environment, according to various embodiments of the present disclosure.

FIG. 4 shows a sequence diagram that provides one example of functionality implemented by components of the networked environment 100. It is understood that the sequence diagram of FIG. 4 provides merely an example of the many different types of functional arrangements that can be employed to implement the portions of the networked environment 100 as described herein. As an alternative, the sequence diagram of FIG. 4 can be viewed as depicting an example of elements of a method implemented within the networked environment 100.

At step 403, the messaging application 115 can provide the processing application 118 with a plurality of messages. The plurality of messages can be messages suitable for training the sequence-to-sequence model. For example, the plurality of messages can include messages from a publicly available mass dataset of electronic messages. As another example, the plurality of messages can include messages sent and received by users associated with an enterprise, organization, or other group that administers the computing environment 103 or the messaging service 106.

At step 406, the processing application 118 can process the plurality of messages. The processing application 118 can identify any formatting elements in the body of each of the plurality of messages. If the any of the plurality of messages includes one or more formatting elements, the processing application 118 can generate a token that represents each of those formatting elements. The processing application 118 can then replace the formatting elements with their corresponding tokens in the text of the corresponding message to generate a processed message. The processing application 118 can likewise generate a processed message for each of the plurality of messages to produce a plurality of processed messages. At step 409, the processing application 118 can then provide the plurality of processed messages to the formatting application 124.

At step 412, the formatting application 124 can be trained using the plurality of processed messages. For example, the plurality of processed messages can be used to train a sequence-to-sequence model or other model employed by the formatting application 124. Training the formatting application 124 can allow the formatting application 124 to learn both common formatting styles for electronic messages, as well as formatting preferences for individual users in different circumstances.

Figure 5:
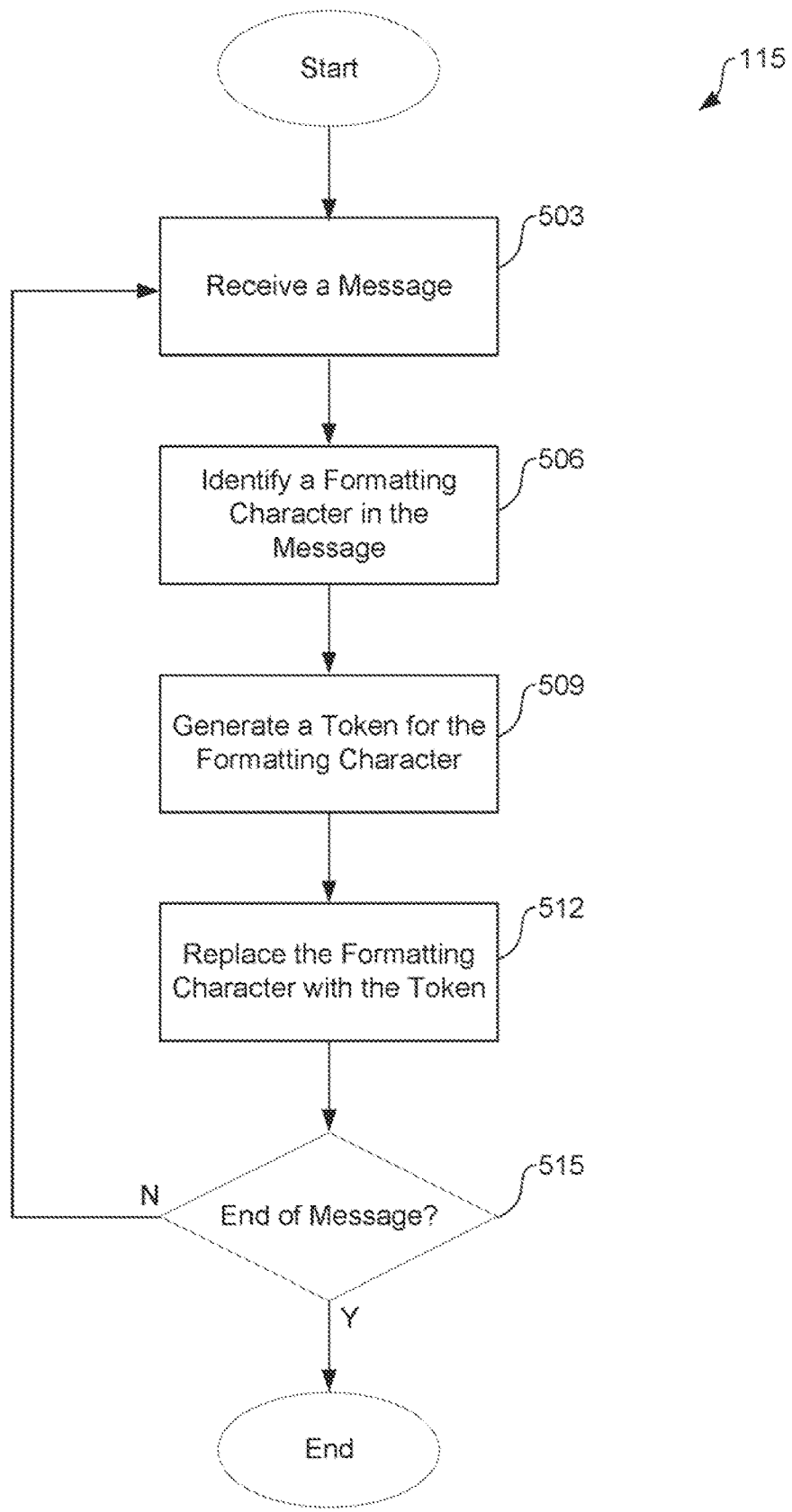
FIG. 5 shows a flowchart that provides one example of functionality implemented by a formatting application, according to various embodiments of the present disclosure.

FIG. 5 shows a flowchart that provides one example of functionality implemented by the processing application 118. The flowchart of FIG. 5 provides merely an example of the many different types of functional arrangements that can be employed to implement the operation of the depicted portion of the processing application 118. As an alternative, the flowchart of FIG. 5 can be viewed as depicting an example of elements of a method implemented within the networked environment 100.

At step 503, the processing application 118 can receive an electronic message. The message can include a header with metadata that indicates one or more intended recipients of the message, which can include one or more primary intended recipients and any secondary intended recipients. The message can further include a body that can include text and one or more formatting elements.

At step 506, the processing application 118 can identify a formatting element in the message. For example, the processing application 118 can sequentially examine characters or other data in the body of the message. The processing application 118 can determine whether each character or other datum is a formatting element. The processing application 118 can continue to examine the characters and other data in the body of the message until a formatting element is encountered.

At step 509, the processing application 118 can generate a token corresponding to the formatting element. The token can be any character-based token or other form of token that can represent the formatting element. Likewise, the token can represent a manner in which the formatting element is applied to the text in the body of the message.

At step 512, the processing application 118 can replace the formatting element in the message with the token corresponding to the formatting element. The processing application 118 can generate a processed message by replacing every formatting element in the body of the message with a corresponding token.

At step 515, the processing application 118 can determine whether an end of the message has been reached. For example, the processing application 118 can determine whether any unprocessed data remains in the message. If the end of the message has not been reached, the process can proceed back to step 506. Otherwise, the process can proceed to completion.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A system comprising:
at least one computing device comprising a processor and a memory; and
machine-readable instructions stored in the memory that, when executed by the processor, cause the at least one computing device to at least:
obtain an electronic message to be transmitted to a plurality of recipients including at least a first recipient and a second recipient;
generate a processed message based at least in part on the electronic message;
determine at least one attribute for the processed message;
generate a first formatting specification for reformatting text in a body of the electronic message for the first recipient based at least in part on a mapping of the at least one attribute to a formatting preference defined for the first recipient of the electronic message and a second formatting specification for reformatting text in a body of the electronic message for the second recipient based at least in part on a mapping of the at least one attribute to a formatting preference defined for the second recipient of the electronic message; and
generate a first reformatted message for the first recipient based at least in part on the first formatting specification and a second reformatted message for the second recipient based at least in part on the second formatting specification.

2. The system of claim 1, wherein the at least one attribute comprises at least one of: a relationship between a sender of the electronic message and the recipient of the electronic message, a type of the electronic message, and a frequency of messages sent.

3. The system of claim 1, wherein the machine-readable instructions that cause the at least one computing device to at least generate the processed message further cause the at least one computing device to at least:
identify a formatting element in the electronic message;
generate a token corresponding to the formatting element; and
generate the processed message based at least in part on the formatting element.

4. The system of claim 1, wherein the reformatted message is generated using a sequence-to-sequence model.

5. The system of claim 4, wherein the machine-readable instructions, when executed by the processor, further cause the at least one computing device to at least:
obtain a plurality of electronic messages;
generate a plurality of processed messages based at least in part on the plurality of electronic messages; and
train the sequence-to-sequence model using the plurality of processed messages.

6. A method for reformatting an electronic message, comprising:
obtaining an electronic message to be transmitted to a plurality of recipients including at least a first recipient and a second recipient;
generating a processed message based at least in part on the electronic message;
determining at least one attribute for the processed message;
generating a first formatting specification for reformatting text in a body of the electronic message for the first recipient based at least in part on a mapping of the at least one attribute to a formatting preference defined for the first recipient of the electronic message and a second formatting specification for reformatting text in a body of the electronic message for the second recipient based at least in part on a mapping of the at least one attribute to a formatting preference defined for the second recipient of the electronic message; and
generating a first reformatted message for the first recipient based at least in part on the first formatting specification and a second reformatted message for the second recipient based at least in part on the second formatting specification.

7. The method of claim 6, wherein the at least one attribute comprises at least one of: a relationship between a sender of the electronic message and the recipient of the electronic message, a type of the electronic message, and a frequency of messages sent.

8. The method of claim 6, wherein the formatting specification comprises a set of formatting rules corresponding to the at least one attribute.

9. The method of claim 6, wherein generating the processed message based at least in part on the electronic message further comprises:
identifying a formatting element in the electronic message;
generating a token corresponding to the formatting element; and
generating the processed message based at least in part on the formatting element.

10. The method of claim 6, wherein the reformatted message is generated using a sequence-to-sequence model.

11. The method of claim 10, further comprising:
obtaining a plurality of electronic messages;
generating a plurality of processed messages based at least in part on the plurality of electronic messages; and
training the sequence-to-sequence model using the plurality of processed messages.

12. A non-transitory, computer-readable medium comprising machine-readable instructions that, when executed by a processor of at least computing device, cause the processor to at least:
obtain an electronic message to be transmitted to a plurality of recipients including at least a first recipient and a second recipient;
generate a processed message based at least in part on the electronic message;
determine at least one attribute for the processed message;
generate a first formatting specification for reformatting text in a body of the electronic message for the first recipient based at least in part on a mapping of the at least one attribute to a formatting preference defined for the first recipient of the electronic message and a second formatting specification for reformatting text in a body of the electronic message for the second recipient based at least in part on a mapping of the at least one attribute to a formatting preference defined for the second recipient of the electronic message; and
generate a first reformatted message for the first recipient based at least in part on the first formatting specification and a second reformatted message for the second recipient based at least in part on the second formatting specification.

13. The non-transitory, computer-readable medium of claim 12, wherein the at least one attribute comprises at least one of: a relationship between a sender of the electronic message and the recipient of the electronic message, a type of the electronic message, and a frequency of messages sent.

14. The non-transitory, computer-readable medium of claim 12, wherein the formatting specification comprises a set of formatting rules corresponding to the at least one attribute.

15. The non-transitory, computer-readable medium of claim 12, wherein the machine-readable instructions that cause the processor to at least generate the processed message further cause the processor to at least:
   identify a formatting element in the electronic message;
   generate a token corresponding to the formatting element; and
   generate the processed message based at least in part on the formatting element.

16. The non-transitory, computer-readable medium of claim 12, wherein the reformatted message is generated using a sequence-to-sequence model, and the machine-readable instructions, when executed by the processor, further cause the processor to at least:
   obtain a plurality of electronic messages;
   generate a plurality of processed messages based at least in part on the plurality of electronic messages; and
   train the sequence-to-sequence model using the plurality of processed messages.

\* \* \* \* \*